July 16, 1957     H. A. LESLIE ET AL     2,799,218
CITRUS OIL EXTRACTION PROCESS
Filed Aug. 8, 1955     3 Sheets-Sheet 1

HARRY A. LESLIE
PETER L. DOUGLAS
EDWIN C. THIES
INVENTORS

BY Lyon & Lyon
ATTORNEYS

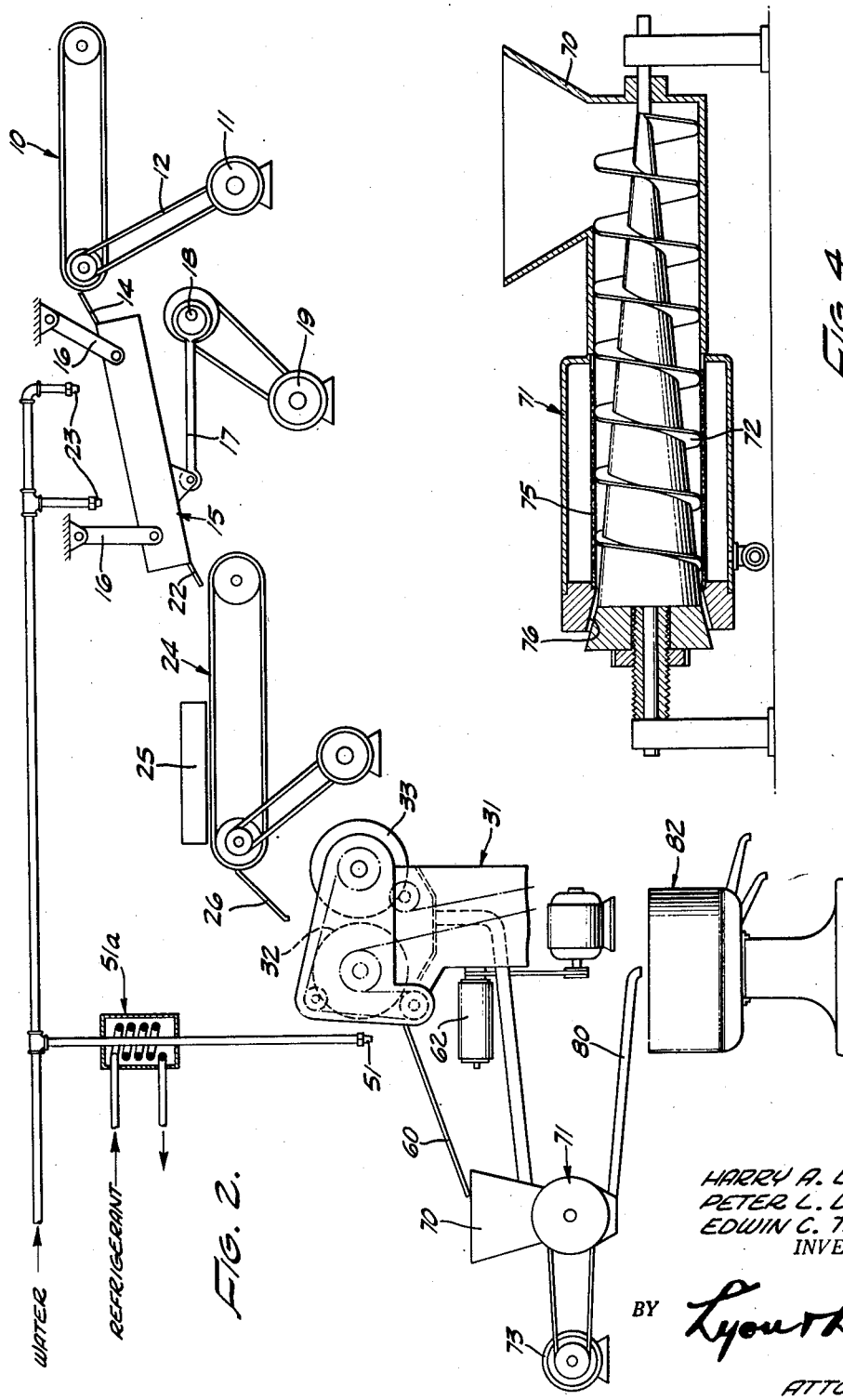

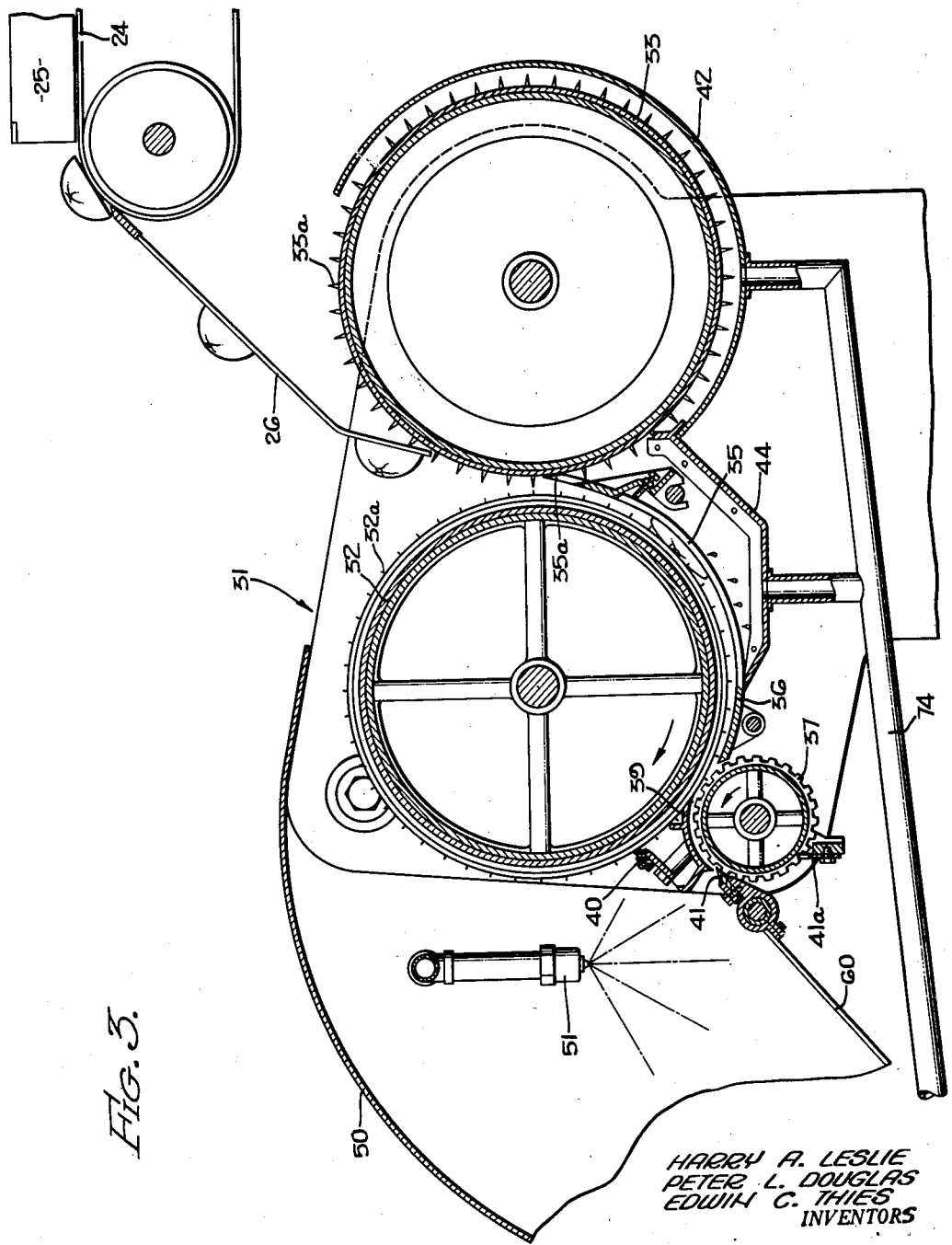

United States Patent Office 2,799,218
Patented July 16, 1957

2,799,218

CITRUS OIL EXTRACTION PROCESS

Harry A. Leslie, Covina, Peter L. Douglas, Glendora, and Edwin C. Thies, Whittier, Calif., assignors to Citrus Equipment Corporation, Whittier, Calif., a corporation of California Application August 8, 1955, Serial No. 526,859

6 Claims. (Cl. 100—37)

This invention relates to the recovery of citrus oil from the peel of citrus fruit.

One of the principal objects of this invention is to provide a novel process and apparatus for the recovery of valuable oil from the peel of citrus fruit.

Another object of this invention is to provide a novel process and apparatus for the recovery of citrus fruit peel oil in a highly efficient manner, the product recovered being of excellent quality.

Citrus peel oil, and particularly lemon peel oil, is an extremely valuable citrus product, lemon peel oil, for example, being in great demand for use as a flavoring agent in many food preparations. Generally, present processing practice for the recovery of peel oil merely comprises crushing of the peel, from which the juice has been extracted, in a press to drive out the oil. This process is extremely inefficient for the reason that the peel contains only a relatively small amount of oil, most of which is located in or adjacent the outer skin or flavedo layer, yet these present practices require operating upon the entire peel. Thus, a great amount of unproductive material is processed and, additionally, the crushing of such material results in losses through absorption of considerable quantities of the oil thereon. Another object of this invention is, therefore, to provide a process and apparatus which are not subject to these and other disadvantages of such conventional processing.

Other objects and advantages of this invention it is believed will be readily apparent from the following detailed description of a preferred embodiment thereof when read in connection with the accompanying drawings.

In the drawings:

Figure 2 is a side elevation illustrating the apparatus of Figure 1.

Figure 3 is a sectional elevational taken substantially on line 3—3 of Figure 1.

Figure 4 is a side elevation, partly in vertical elevation, illustrating a screw press utilized in the removal of oil from the oil-bearing portions of the citrus peel.

Figure 1:
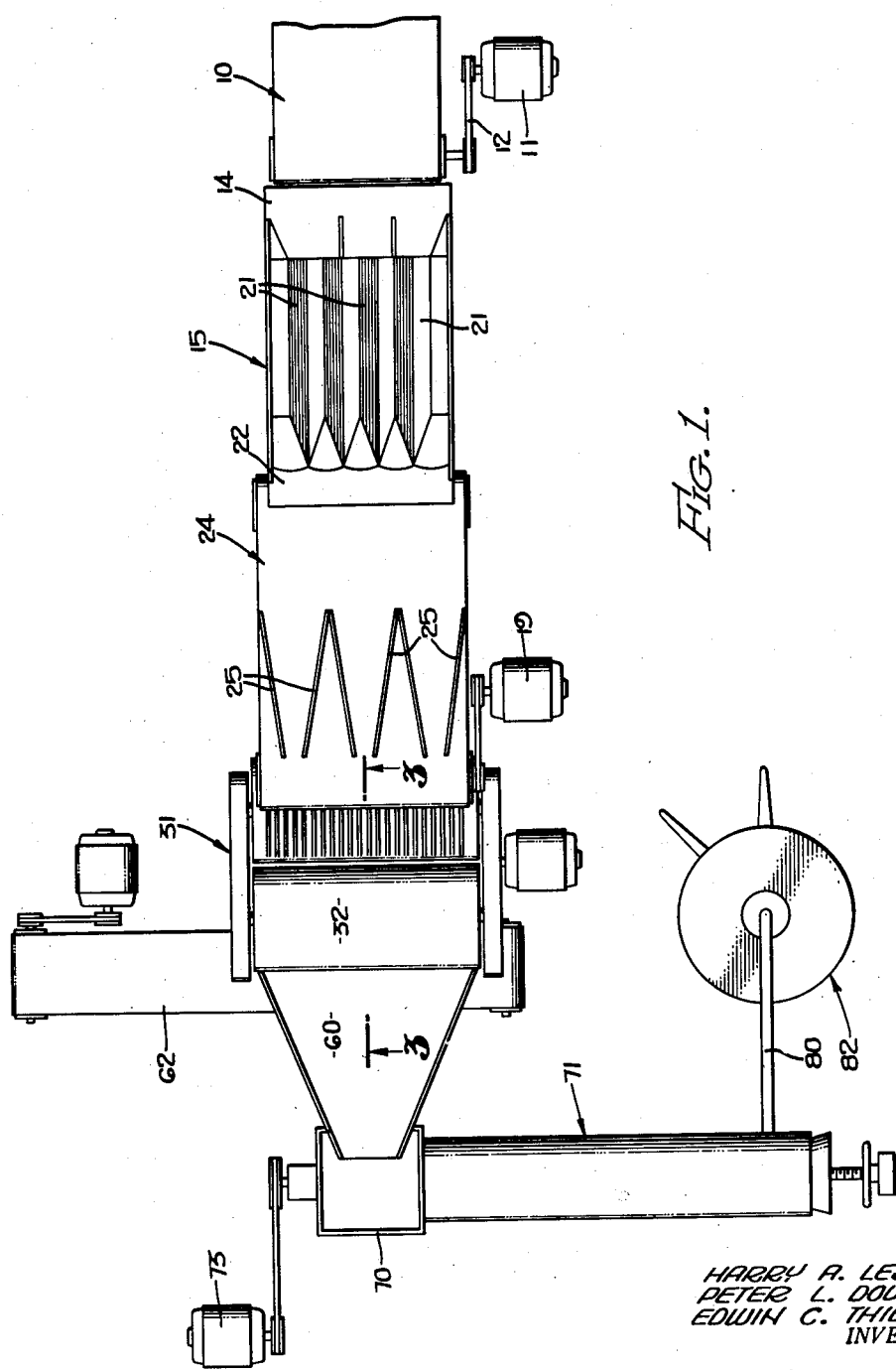
Figure 1 is a top plan view diagrammatically illustrating the process and apparatus of this invention.

Briefly, this invention comprehends within its scope the discovery that yields of high-quality citrus peel oil not heretofore possible may be obtained by first halving the citrus fruit and removing the juice from the citrus fruit, then orienting the remaining fruit peel halves so that they are all disposed in the same manner, flattening the peel halves, removing the oil-bearing flavedo layer from the albedo and rag portions of the peel, and then pressing the oil-bearing material to extract the oil therefrom. An apparatus including provision for removing the oil-bearing skin or rind from peel halves is disclosed in United States Letters Patent No. 2,212,066 issued August 20, 1940, to Lawrence A. Fry on "Method and Apparatus for Recovering Valuable Constituents From Citrus Fruit." The present invention utilizes certain features of the invention of said patent, but involves improvements thereover, as will appear more fully hereinafter.

Referring now to the drawings, in carrying out the process of this invention, the citrus fruit, such as lemons, is cut into halves and the juice and pulp extracted therefrom in any conventional manner, such as in reamer type citrus juice extracting machines. A suitable juice extracting machine is disclosed in United States Letters Patent No. 2,199,876 issued to William O. Brown. The fruit peel halves are then deposited, in random arrangement, upon a belt conveyor 10 which is continuously driven by means of an electric motor 11 through a power transmission 12. The peel halves are discharged from the conveyor 10 onto a downwardly sloping delivery chute 14 carried on a peel orienting device 15.

The peel orienter 15 is of generally conventional construction and of the type used in the food industry for orienting fruit halves and the like preparatory to further processing. The orienter is provided with vibrating means, being mounted on pivoted arms 16, and having a crank element 17 pivoted at one end to the orienter proper and eccentrically journaled at the other end to a shaft 18 driven by an electric motor 19. The orienter includes a downwardly-inclined tray having an upper surface consisting of a plurality of longitudinal V-shaped troughs 21. The depth of the troughs is approximately one and one-half times the maximum diameter of the fruit peel halves. The walls forming the troughs flare out into a flat discharge tray 22. From this description it will be understood that as the peel halves are delivered to the orienter 15, they fall into the troughs and slide therealong under the impetus of the vibrating motion, whereupon they are gradually laid over, cut face down, on the discharge tray 22. Water spray elements 23 are positioned above the orienter for washing of the peel halves and lubrication of the orienter surface.

The face-down fruit halves then slide onto a conveyor belt 24 which delivers them to the peel-removal apparatus 31, the belt having positioned thereabove a plurality of stationary, inclined baffles 25 adapted to channel the fruit halves into proper lateral adjustment for delivery to the apparatus 31.

This apparatus 31 is in many respects identical to that disclosed in said United States Letters Patent No. 2,212,066. Thus, it comprises a pair of counter-rotating drums 32 and 33 having peel-engaging pins 32a and spikes 33a; a stationary, adjustable grid structure 35, which is curved to conform substantially to the peripheral contour of the drum 32 and is convergently spaced therefrom so that fruit halves conveyed therebetween are gradually compressed and flattened; a solid extended element 36 leading from the grid structure; a grooved cylinder 37 mounted adjacent the extended element 36 and rotated in a direction opposite to that of the drum 32; a curved blade 39 adapted to deflect the peel from the surface of the drum 32 and forming an oil-collecting trough; an oil-removing resilient wiper 40 which contacts the surface of the drum 32; a knife blade 41 adapted to cooperate with the cylinder 37 for shaving off the oil-bearing flavedo portion of the peel; a comb or series of combs 41a; a shield 42 surrounding the drum 33; and a juice collecting hopper 44. In the present apparatus, the fruit severing knives are not required and are dispensed with, and the apparatus of said patent is further modified by the addition of a substantially vapor-tight sheet metal housing 50 enclosing the drum 32 and associated parts, and a plurality of water spray or fog nozzles 51 positioned to spray into the area surrounding the shaving knife blade 41. The remainder of the apparatus 31, such as the drive mechanisms and the like, need not be described here, since it is shown and described in detail in said Patent No. 2,212,066.

The oriented fruit peel halves are discharged from the conveyor belt 24 onto a grid-like chute 26 from which they slide onto the drum 33. The fruit peel halves are sheared away from contact with the drum 33 by the leading edge 35a of the grid structure 35, and are conveyed by the drum 32 into and through the passage between the grid structure and the drum, the converging relationship between these two elements serving to press the fruit peels flat with the skin sides up, as shown. During this operation any residual juice will be extracted and collected by the hopper 44. As the flattened peels are passed over the extended element 36, they contact the cylinder 37 and are thereby conveyed between the cylinder and curved blade 39 to be presented to the knife blade 41. This latter blade shaves substantially the entire flavedo layer of the peel away from the albedo and rag portions thereof. The blade 39 is adjusted so that the portions shaved off are very thin, and these portions fall downwardly on the chute 60 which forms the bottom of the housing 50. The albedo and rag portions of the peels are carried under the knife blade 39 and removed from the cylinder 37 by means of the combs 41a, thence falling onto the transverse discharge conveyor 62.

Fractions of the peel oil are highly volatile and, accordingly, the housing 50 and spray means 51 are important features of the invention, insofar as high yields are concerned, inasmuch as the housing is substantially vapor-tight. A cold water fog is produced by the spray means 51, blanketing the areas around the skin shaving blade 41 and associated parts with a fine mist which traps and condenses any oils released and volatilized during the shaving operation. While water at room temperature may be used, superior results are obtained by refrigerating the water to a temperature of between about 35° and about 60° F. by means of a conventional refrigeration unit 51a. A temperature of about 40° F. is preferred. The resulting emulsified drainage proceeds down the chute 60 along with the shaved flavedo layers. Any oil adhering to the drum 32 is removed therefrom by the wiper 40 and is also mixed with the drainage on the chute 60.

The chute 60 feeds into the hopper 70 of a conventional screw press 71 provided with a screw conveyor 72 driven by a motor 73. A pipe 74 leads to the hopper 70 from the hopper 44 and the shield 42. The press includes a cylindrical screen 75 against which the shaved peel (flavedo) is forced, rupturing the oil-bearing cells and liberating the oil. The oil, water and residual juice is forced out through the screen and thus separated from the depleted flavedo portions, the latter portions being forced out through the conical annulus 76 in the end of the press.

The oil-containing liquid from the press 71 is fed through the pipe 80 to a centrifuge 82 for separation of the peel oil from the aqueous phase to provide the final product.

The process and apparatus of this invention have proved to be far superior to presently-used methods for recovery of citrus peel oil, both from the standpoint of efficiency and quality of product. Thus, while a yield of about 5 pounds of oil per ton of lemons has heretofore been considered to be a maximum for commercial production, yields of 7-8 pounds per ton have now been obtained with the process and apparatus of this invention. The oil recovered in these high yields was of the highest quality, from the standpoints of both citral content and optical rotation.

This application is a continuation-in-part of our co-pending application Serial No. 508,462, filed May 16, 1955, for Citrus Oil Recovery Process and Apparatus, Harry A. Leslie, Peter L. Douglas and Edwin C. Thies, inventors.

Having fully described our invention, it is to be understood that we do not wish to be limited to the details set forth, but our invention is of the full scope of the appended claims.

We claim:

1. A process for the extraction of peel oil from citrus fruit, the steps comprising, in sequence, halving the fruit, separating the juice and pulp to produce peel halves while maintaining substantially the original shape of the fruit peel halves, orienting the peel halves so that they are all disposed with the cut faces thereof in substantially the same plane, flattening said peel halves, cutting each flattened peel half to separate the flavedo layer therefrom, pressing the separated flavedo layers to rupture the oil-bearing cells thereof and to liberate the oil therefrom, separating the oil from the flavedo layers and collecting said oil.

2. A process for the extraction of peel oil from citrus fruit, the steps comprising, in sequence, halving the fruit, separating the juice and pulp to produce peel halves while maintaining substantially the original shape of the fruit peel halves, orienting the peel halves so that they are all disposed with the cut faces thereof in substantially the same plane, flattening said peel halves, cutting each flattened peel half to separate the flavedo layer therefrom, rupturing the oil-bearing cells in the flavedo layers to liberate the oil therefrom, separating the oil from the flavedo layers and collecting said oil.

3. A process for the extraction of peel oil from citrus fruit, the steps comprising, in sequence, halving the fruit, separating the juice and pulp to produce peel halves, orienting the peel halves while maintaining substantially the original shape of the fruit peel halves so that they are all disposed with the cut faces thereof in substantially the same plane, flattening said peel halves, cutting each flattened peel half to separate the flavedo layer therefrom, maintaining said peel halves under a cold water spray during said cutting step to condense oil released from said peel halves during said cutting step, pressing the separated flavedo layers to rupture the oil-bearing cells thereof and to liberate the oil therefrom, separating the oil and water from the flavedo layers, and separating the oil from the water.

4. A process for the extension of peel oil from citrus fruit, the steps comprising, in sequence, halving the fruit, separating the juice and pulp to produce peel halves, orienting the peel halves while maintaining substantially the original shape of the fruit peel halves so that they are all disposed with the cut faces thereof in substantially the same plane, flattening said peel halves, cutting each flattened peel half to separate the flavedo layer therefrom, maintaining said peel halves under a cold water spray during said cutting step to condense oil released from said peel halves during said cutting step, rupturing the oil-bearing cells in the flavedo layers to liberate the oil therefrom, separating the oil and water from the flavedo layers and separating the oil from the water.

5. A process for the extraction of peel oil from citrus fruit, the steps comprising, in sequence, halving the fruit, separating the juice and pulp to produce peel halves while maintaining substantially the original shape of the fruit peel halves, orienting the peel halves so that they are all disposed with the cut faces thereof in substantially the same plane, flattening said peel halves, cutting each flattened peel half in an enclosed area to separate the flavedo layer therefrom; blanketing said enclosed area with a cold water fog to trap and condense oil released from said peel during said cutting step, pressing the separated flavedo layers to rupture the oil-bearing cells thereof and to liberate the oil therefrom, separating the oil and water from the flavedo layers, and separating the oil from the water.

6. A process for the extraction of peel oil from citrus fruit, the steps comprising, in sequence, halving the fruit, separating the juice and pulp to produce peel halves while maintaining substantially the original shape of the fruit peel halves, orienting the peel halves so that they are all disposed with the cut faces thereof in substantially the same plane, flattening said peel halves, cutting each flattened peel half in an enclosed area to separate the flavedo layer therefrom; blanketing said enclosed area with a cold water fog to trap and condense oil released from said peel during said cutting step, rupturing the oil-bearing cells in the flavedo layers to liberate the oil therefrom, separating the oil and water from the flavedo layers, and separating the oil from the water.

References Cited in the file of this patent

UNITED STATES PATENTS

| | | |
|---|---|---|
| 1,527,911 | Patti | Feb. 24, 1925 |
| 1,699,995 | Shields | June 22, 1929 |
| 2,004,056 | Pipkin | June 4, 1935 |
| 2,212,066 | Fry | Aug. 20, 1940 |
| 2,527,364 | Koffler | Oct. 24, 1950 |
| 2,533,139 | Polk | Dec. 5, 1950 |